(12) United States Patent
Yang et al.

(10) Patent No.: US 7,782,817 B2
(45) Date of Patent: Aug. 24, 2010

(54) SYSTEMS AND TECHNIQUES FOR IMPROVED DATA THROUGHPUT IN A WIRELESS NETWORK

(75) Inventors: Xiangying Yang, Hillsboro, OR (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 864 days.

(21) Appl. No.: 11/267,608

(22) Filed: Nov. 4, 2005

(65) Prior Publication Data
US 2007/0104129 A1 May 10, 2007

(51) Int. Cl.
*H04W 4/00* (2009.01)
(52) U.S. Cl. .................. 370/329; 370/437; 370/341
(58) Field of Classification Search .......... 370/310–350
See application file for complete search history.

(56) References Cited
U.S. PATENT DOCUMENTS

2002/0010001 A1* 1/2002 Dahlman et al. ............ 455/522
2002/0141355 A1* 10/2002 Struhsaker et al. .......... 370/280
2005/0152350 A1* 7/2005 Sung et al. .................. 370/376
2006/0067389 A1* 3/2006 Tounai et al. ............... 375/219
2008/0137577 A1* 6/2008 Habetha ..................... 370/311

FOREIGN PATENT DOCUMENTS

| WO | 2000067498 A1 | 11/2000 |
| WO | 2003019805 A1 | 3/2003 |
| WO | 2006007025 A2 | 1/2006 |
| WO | 2007056107 A2 | 5/2007 |

OTHER PUBLICATIONS

Abeta, S., et al., "Broadband Packet Wireless Access Incorporating High-Speed IP Packet Transmission", IEEE 56th, Vehicular Technology Conference Proceedings 1(4), (Sep. 24, 2007), 844-848.
Jungnam, Y., et al., "Adaptive Resource Allocations for D-TDD Systems in wireless cellular networks", Military Communications Conference, (2004), 1047-1053.

* cited by examiner

*Primary Examiner*—Patrick N Edouard
*Assistant Examiner*—Wayne Cai
(74) *Attorney, Agent, or Firm*—Kacvinsky LLC

(57) ABSTRACT

Techniques to improve data communications for a wireless system are described. An apparatus may include an asymmetric data channel manager to perform asymmetric link adaptation for multiple wireless data channels based on a class of data flow for each data channel. Other embodiments are described and claimed.

22 Claims, 11 Drawing Sheets

300

SYSTEMS AND TECHNIQUES FOR IMPROVED DATA THROUGHPUT IN A WIRELESS NETWORK

BACKGROUND

Modern wireless communication systems may perform data communications in accordance with various Institute of Electrical and Electronics Engineers (IEEE) standards such as the 802.11 standards for Wireless Local Area Networks (WLANs) and the 802.16 standards for Wireless Metropolitan Area Networks (WMANs). For example, Worldwide Interoperability for Microwave Access (WiMAX) is a wireless broadband technology based on the IEEE 802.16 standard of which IEEE 802.16-2004 and the 802.16e amendment are Physical (PHY) layer specifications. These wireless communication systems, however, may need to support data communications over a wireless network using the same techniques typically used for wired data communications, even though the channel characteristics for a wireless network may differ significantly from the channel characteristics for a wired network. Consequently, there may be a need for improved data communication techniques for a wireless device or network.

BRIEF SUMMARY OF THE INVENTION

Various embodiments are directed to techniques to improve data communications for a wireless system. In some embodiments, an apparatus may include an asymmetric data channel manager to perform asymmetric link adaptation for multiple wireless data channels based on a class of data flow for each data channel. Other embodiments are described and claimed.

DETAILED DESCRIPTION

Various embodiments may be generally directed to techniques to improve data communications for a wireless system. More particularly, various embodiments may be arranged to implement techniques to improve data throughput on wireless access networks. As used herein, the term "throughput" may refer to an amount of information that may be communicated on an end-to-end basis, which may include both wired and wireless links. Throughput is typically measured in bits-per-second (bps) or bytes-per-second (Bps). In one embodiment, for example, an apparatus may include an asymmetric data channel manager to perform asymmetric link adaptation for multiple wireless data channels based on a class of data flow communicated for each data channel. The apparatus may further comprise an error control manager to perform error control for the data channels in accordance with an automatic repeat-request (ARQ) protocol using various improved error control parameters. Other embodiments are described and claimed.

Figure 1:
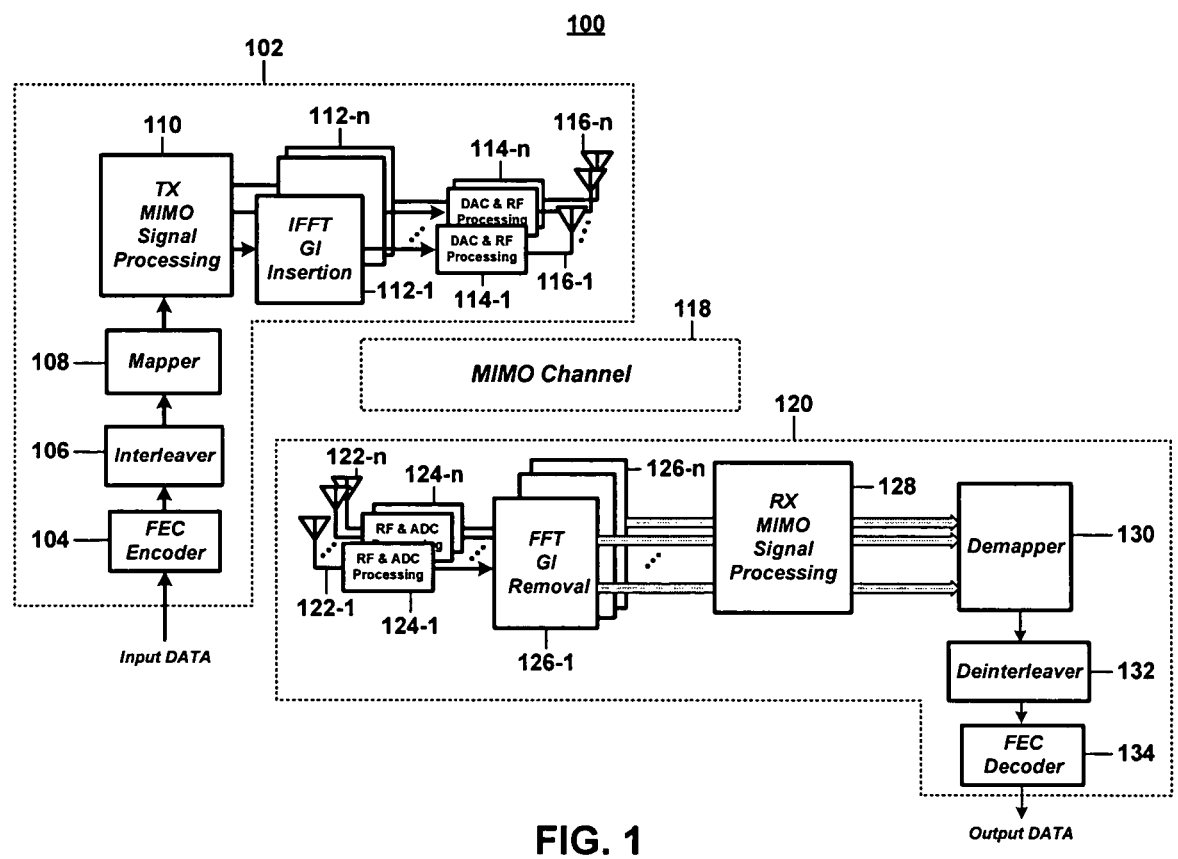
FIG. 1 illustrates one embodiment of a communications system.

FIG. 1 illustrates one embodiment of a system. FIG. 1 illustrates a block diagram of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, a node may comprise, or be implemented as, a computer system, a computer sub-system, a computer, an appliance, a workstation, a terminal, a server, a personal computer (PC), a laptop, an ultra-laptop, a hand-held computer, a personal digital assistant (PDA), a set top box (STB), a telephone, a mobile telephone, a cellular telephone, a handset, a wireless access point, a base station (BS), a subscriber station (SS), a mobile subscriber center (MSC), a radio network controller (RNC), a microprocessor, an integrated circuit such as an application specific integrated circuit (ASIC), a programmable logic device (PLD), a processor such as general purpose processor, a digital signal processor (DSP) and/or a network processor, an interface, an input/output (I/O) device (e.g., keyboard, mouse, display, printer), a router, a hub, a gateway, a bridge, a switch, a circuit, a logic gate, a register, a semiconductor device, a chip, a transistor, or any other device, machine, tool, equipment, component, or combination thereof. The embodiments are not limited in this context.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, microcode for a network processor, and so forth. The embodiments are not limited in this context.

The nodes of the communications system 100 may be arranged to communicate one or more types of information, such as media information and control information. Media information generally may refer to any data representing content meant for a user, such as image information, video information, graphical information, audio information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner. The media and control information may be communicated from and to a number of different devices or networks.

In various implementations, the nodes of the communications system 100 may be arranged to segment a set of media information and control information into a series of packets. A packet generally may comprise a discrete data set having fixed or varying lengths, and may be represented in terms of bits or bytes. It can be appreciated that the described embodiments are applicable to any type of communication content or format, such as packets, cells, frames, fragments, units, and so forth.

The communications system 100 may communicate information in accordance with one or more standards, such as standards promulgated by the IEEE, the Internet Engineering Task Force (IETF), the International Telecommunications Union (ITU), and so forth. In various embodiments, for example, the communications system 100 may communicate information according to one or more IEEE 802 standards including IEEE 802.11 standards (e.g., 802.11a, b, g/h, j, n, and variants) for WLANs and/or 802.16 standards (e.g., 802.16-2004, 802.16.2-2004, 802.16e, 802.16f, and variants) for WMANs. The communications system 100 may communicate information according to one or more of the Digital Video Broadcasting Terrestrial (DVB-T) broadcasting standard and the High performance radio Local Area Network (HiperLAN) standard. The embodiments are not limited in this context.

In various embodiments, the communications system 100 may employ one or more protocols such as medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), and so forth.

The communications system 100 may include one or more nodes arranged to communicate information over one or more wired and/or wireless communications media. Examples of wired communications media may include a wire, cable, printed circuit board (PCB), backplane, switch fabric, semiconductor material, twisted-pair wire, co-axial cable, fiber optics, and so forth. An example of a wireless communication media may include portions of a wireless spectrum, such as the radio-frequency (RF) spectrum. In such implementations, the nodes of the system 100 may include components and interfaces suitable for communicating information signals over the designated wireless spectrum, such as one or more transmitters, receivers, transceivers, amplifiers, filters, control logic, antennas and so forth.

The communications media may be connected to a node using an input/output (I/O) adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), a line card, a disc controller, video controller, audio controller, and so forth.

In various embodiments, the communications system 100 may comprise or form part of a network, such as a WiMAX network, a broadband wireless access (BWA) network, a WLAN, a WMAN, a wireless wide area network (WWAN), a wireless personal area network (WPAN), an SDMA network, a Code Division Multiple Access (CDMA) network, a Wideband CDMA (WCDMA) network, a Time Division Synchronous CDMA (TD-SCDMA) network, a Time Division Multiple Access (TDMA) network, an Extended-TDMA (E-TDMA) network, a Global System for Mobile Communications (GSM) network, an Orthogonal Frequency Division Multiplexing (OFDM) network, an Orthogonal Frequency Division Multiple Access (OFDMA) network, a North American Digital Cellular (NADC) network, a Universal Mobile Telephone System (UMTS) network, a third generation (3G) network, a fourth generation (4G) network, a local area network (LAN), a wide area network (WAN), a metropolitan area network (MAN), the Internet, the World Wide Web, a cellular network, a radio network, a satellite network, and/or any other communications network configured to carry data. The embodiments are not limited in this context.

In various embodiments, the communications system 100 may be arranged to perform data communications using any number of different wireless protocols over various wireless communications media. In one embodiment, for example, various nodes of communications system 100 may be arranged to perform data communications using any number of different data communications systems or techniques, such as GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, one or more IEEE 802 standards including IEEE 802.11 standards (e.g., 802.11a, b, g/h, j, n, and variants) for WLANs and/or 802.16 standards (e.g., 802.16-2004, 802.16.2-2004, 802.16e, 802.16f, and variants), DVB-T, HiperLAN, and others. The embodiments are not limited in this respect.

The communications system 100 may form part of a multi-carrier system such as a MIMO system. The MIMO system may employ one or more multi-carrier communications channels for communicating multi-carrier communication signals. A multi-carrier channel may comprise, for example, a wideband channel comprising multiple sub-channels. The MIMO system may be arranged to communicate one or more spatial data streams using multiple antennas. Examples of an antenna include an internal antenna, an omni-directional antenna, a monopole antenna, a dipole antenna, an end fed antenna, a circularly polarized antenna, a micro-strip antenna, a diversity antenna, a dual antenna, an antenna array, and so forth.

In various embodiments, the system 100 may comprise a physical (PHY) layer component for WLAN devices either hardware or software based on IEEE standards 802.11n, 802.16-2004, and/or 802.16e, for example. In one embodiment, the communications system 100 may comprise a transceiver for a MIMO-OFDM system. The embodiments are not limited in this context.

As shown in FIG. 1, the communications system 100 may be illustrated and described as comprising several separate functional elements, such as modules and/or blocks. In various embodiments, the modules and/or blocks may be connected by one or more communications media. Communications media generally may comprise any medium capable of carrying information signals. For example, communication media may comprise wired communication media, wireless communication media, or a combination of both, as desired for a given implementation.

The modules and/or blocks may comprise, or be implemented as, one or more systems, sub-systems, processors, devices, machines, tools, components, circuits, registers, applications, programs, subroutines, or any combination thereof, as desired for a given set of design or performance constraints. Although certain modules and/or blocks may be described by way of example, it can be appreciated that a greater or lesser number of modules and/or blocks may be used and still fall within the scope of the embodiments. Further, although various embodiments may be described in terms of modules and/or blocks to facilitate description, such modules and/or blocks may be implemented by one or more hardware components (e.g., processors, DSPs, PLDs, ASICs, circuits, registers), software components (e.g., programs, subroutines, logic) and/or combination thereof.

The communications system 100 may comprise a transmitter node 102. In one embodiment, for example, the transmitter node 102 may comprise a MIMO transmitter to transmit one or more spatial data streams over a multicarrier communication channel.

The transmitter node 102 may comprise an encoder block 104. In various embodiments, the encoder block 104 may be arranged to generate an encoded bit sequence from input data flow. The encoder block 104 may use various coding rates (e.g., 1/2, 2/3, 3/4) depending on the puncturing pattern. In one embodiment, for example, the encoder block 104 may comprise an error-correcting encoder, such as a forward error correcting (FEC) encoder, and may generate a bit sequence encoded with an FEC code. In other embodiments, the encoder block 104 may comprise a convolutional encoder. The embodiments are not limited in this context.

The transmitter node 102 may comprise an interleaver block 106. In various embodiments, the interleaver block 106 may perform interleaving on the bits of the encoded bit sequence. In one embodiment, for example, the interleaver block 106 may comprise a frequency interleaver. The embodiments are not limited in this context.

The transmitter node 102 may comprise a mapper block 108. In various embodiments, the mapper block 108 may map the interleaved bit sequence into a sequence of transmit symbols. In one embodiment, for example, the mapper block 108 may map the interleaved bit sequence into a sequence of OFDM symbols. Each OFDM symbol may comprise N frequency symbols, with N representing a positive integer (e.g., 16, 64). In various implementations, the mapper block 108 may map the transmit symbols to subcarrier signals of a multicarrier communication channel.

The transmitter node 102 may comprise a transmit (TX) MIMO signal processing block 110. In various embodiments, the TX MIMO signal processing block 110 may be arranged to perform various multiple antenna signal processing techniques such as such as space-time coding (STC), TX beamforming, MIMO coding, and/or other MIMO processing techniques, for example. In various implementations, the TX MIMO signal processing block 110 may be arranged to apply beamformer and/or equalizer weights to transmit symbols (e.g., OFDM symbols). In various implementations, one or more of the MIMO signal processing techniques may involve the calculation of weight matrices for every subcarrier and/or or group of adjacent subcarriers and the multiplication of OFDM subcarrier symbols in the frequency domain by a weighting matrix. The embodiments are not limited in this context.

The transmitter node 102 may comprise inverse fast Fourier transform (IFFT) blocks 112-1-$n$, where n represents a positive integer value. In various embodiments, the IFFT blocks 112-1-$n$ may be arranged to convert OFDM symbols to time-domain signals. In various implementations, the IFFT blocks 112-1-$n$ may perform guard interval (GI) insertion. In such implementations, GI insertion may comprise inserting a time-domain guard interval between OFDM symbols to reduce inter-symbol interference.

The transmitter node 102 may comprise digital-to-analog conversion (DAC) and radio-frequency (RF) processing blocks 114-1-$n$, where n represents a positive integer value. In various embodiments, the DAC and RF processing blocks 114-1-$n$ may be arranged to perform DAC processing and to generate RF signals for transmission on the spatial channels of a multicarrier communication channel.

The transmitter node 102 may comprise transmit antennas 116-1-$n$, where n represents a positive integer value. In various embodiments, each of the transmit antennas 116-1-$n$ may correspond to one of the spatial channels of a multicarrier communications channel.

The transmitter node 102 may transmit information over communication channel 118. In various embodiments, the communication channel 118 may comprise a multicarrier communication channel (e.g., MIMO channel) for communicating multicarrier communication signals (e.g., OFDM signals). The MIMO channel may comprise, for example, a wideband channel comprising multiple subchannels. Each subchannel may comprise closely spaced orthogonal data subcarriers allowing a single OFDM symbol to be transmitted together by the data subcarriers. The embodiments are not limited in this context.

The communications system 100 may comprise a receiver node 120 for receiving information over communication channel 118. In various embodiments, the receiver node 120 may comprise receive antennas 122-1-$n$, where n represents a positive integer value. In various implementations, each of the receive antennas 122-1-$n$ may correspond to one of the spatial channels of a multicarrier communications channel.

The transmitter node 102 may comprise RF and analog-to-digital conversion (ADC) processing blocks 124-1-$n$, where n represents a positive integer value. In various embodiments, the RF and ADC processing blocks 124-1-$n$ may be arranged to perform RF and ADC processing on signals received on the spatial channels of a multicarrier communication channel.

The receiver node 122 may comprise fast Fourier transform (FFT) blocks 126-1-$n$, where n represents a positive integer value. In various embodiments, the FFT blocks 126-1-$n$ may be arranged to convert time-domain signals to frequency-domain signals. In various implementations, the FFT blocks 126-1-$n$ may perform GI removal. In such implementations, GI removal may comprise removing a time-domain guard interval between OFDM symbols.

The receiver node 122 may comprise a receive (RX) MIMO signal processing block 128. In various embodiments, the RX MIMO signal processing block 128 may be arranged to perform various multiple antenna signal processing techniques including, for example, channel estimation, frequency domain equalization, space-time decoding, RX beamforming, MIMO decoding, and/or other MIMO processing techniques such as MIMO detection schemes used in 802.11n and 802.16e transceivers. In various implementations, the RX MIMO signal processing block 128 may be arranged to calculate beamformer and/or equalization weights and to apply the beamformer and/or equalizer weights to receive symbols (e.g., OFDM symbols). In various implementations, one or more of the MIMO signal processing techniques may involve the calculation of weight matrices for every subcarrier and/or or group of adjacent subcarriers and the multiplication of OFDM subcarrier symbols in the frequency domain by a weighting matrix to produce linear estimates of the transmitted signal. The embodiments are not limited in this context.

The receiver node 120 may comprise a demapper block 130. In various embodiments, the demapper block 130 may be arranged to demap a sequence of symbols, such as a sequence of OFDM symbols. The embodiments are not limited in this context.

The receiver node 120 may comprise a deinterleaver block 132. In various embodiments, the deinterleaver block 132 may perform deinterleaving on the bits of the encoded bit sequence. In one embodiment, for example, the deinterleaver block 132 may comprise a frequency deinterleaver. The embodiments are not limited in this context.

The receiver node 120 may comprise a decoder block 134. In various embodiments, the decoder block 134 may be arranged to decode an encoded bit sequence into an output data flow. The decoder block 134 may use various coding rates (e.g., 1/2, 2/3, 3/4) depending on the puncturing pattern. In one embodiment, for example, the decoder block 134 may comprise an error-correcting encoder, such as an FEC decoder, and may generate an output data flow from a bit sequence encoded with an FEC code. In other embodiments, the decoder 134 may comprise a convolutional decoder. The embodiments are not limited in this context.

In various embodiments, one or more nodes of communications system 100 may be arranged to implement techniques to improve throughput over one or more wireless data channels arranged to use a connection-oriented transport protocol. Connection-oriented protocols may refer to techniques for transmitting data in which the devices at the end points use a preliminary protocol to establish an end-to-end connection before any data is communicated. A connection-oriented protocol service is sometimes called a "reliable" network service since it guarantees that data will arrive in the proper sequence. For connection-oriented communications, each end point must be able to transmit so that it can communicate. By way of contrast, a connectionless technique may refer to when data is sent from one end point to another without prior arrangement. Connectionless protocols are usually described as stateless because the end points have no protocol-defined way to remember where they are in a "conversation" of message exchanges. Because they can keep track of a conversation, connection-oriented protocols are sometimes described as stateful. An example of a connection-oriented protocol may include TCP. Although some embodiments may be described using TCP by way of example, it may be appreciated that other connection-oriented protocols may also be used and still fall within the scope of the embodiments. The embodiment are not limited in this context.

Connection-oriented transport protocols such as TCP are becoming increasingly important for wireless data communications, particularly for ubiquitous Internet access. For example, TCP is typically used to transport a large percentage of Internet traffic over a wired data channel. Some wireless communication systems, however, may implement data communications over a wireless network using the same techniques typically used for wired data communications, even though the channel characteristics for a wireless network may differ significantly from the channel characteristics for a wired network. In accordance with TCP, for example, a transmitter node may reduce its transmission rate by approximately half when a packet is not received within certain deadline (e.g., due to packet loss). This may be appropriate for wired communications since packet loss is typically due to channel congestion and TCP is designed to alleviate or avoid Internet congestion. In wireless communications, however, the packet loss is more likely caused by other factors, such as channel errors rather than channel congestion. Consequently, a transmitter node with its TCP sessions running over a wireless system may unnecessarily decrease data transmission rates, thereby potentially degrading performance of the entire wireless system.

Various embodiments may attempt to solve these and other problems. In various embodiments, one or more nodes of communications system 100 may be arranged to implement techniques to improve throughput over a wireless data channel arranged to use a connection-oriented transport protocol, such as TCP, for example. This may be accomplished by creating and managing asymmetric wireless channels. Managing asymmetric channels is based on the observation that TCP flows typically carry asymmetric traffic in two directions, one for media information and one for control information. Consequently, download traffic typically dominates server-client based TCP flows found in many popular Hyper-Text Transfer Protocol (HTTP) and File Transfer Protocol (FTP) applications.

In various embodiments, transmitter node 102 and/or receiver node 120 of communications system 100 may be implemented by one or more wireless devices. In some cases, for example, a given wireless device may have a transmitter node 102, a receiver node 120, or both. In the latter case, transmitter node 102 and receiver node 120 may be combined into a single transceiver as desired for a given implementation. Furthermore, operations between a given transmitter node 102 and a given receiver node 120 typically assumes that each are implemented in different wireless devices unless stated otherwise. The embodiments, however, are not limited in this context.

In various embodiments, for example, transmitter node 102 and/or receiver node 120 may be implemented in one or more mobile devices having wireless capabilities. Mobile devices 102-1, 102-2 may comprise generalized equipment sets providing connectivity to other wireless devices, such as other mobile devices or fixed devices. Examples for mobile devices 102-1, 102-2 may include a computer, server, notebook computer, laptop computer, handheld computer, telephone, cellular telephone, personal digital assistant (PDA), combination cellular telephone and PDA, smartphone, one-way pagers, two-way pagers, handheld video devices, handheld audio devices, handheld multimedia devices, and so forth. In one embodiment, for example, the mobile devices may be implemented as mobile stations (STA) for a WLAN, or mobile subscriber stations (MSS) for a WMAN. Although some embodiments may be described with the mobile devices implemented as a STA or MSS by way of example, it may be appreciated that other embodiments may be implemented using other wireless devices as well. The embodiments are not limited in this context.

In various embodiments, for example, transmitter node 102 and/or receiver node 120 may be implemented in one or more fixed devices having wireless capabilities. A fixed device may comprise a generalized equipment set providing connectivity, management, and control of another wireless device, such as one or more mobile devices. Examples for a fixed device may include a wireless access point (AP), base station or node B, router, switch, hub, gateway, server, computer, PC, workstation, and so forth. In one embodiment, for example, the fixed device may comprise a base station or node B for a cellular radiotelephone system. The fixed device may also provide access to a network, and other nodes accessible via the network (such as a web server). The network may comprise, for example, a packet network such as the Internet, a corporate or enterprise network, a voice network such as the Public Switched Telephone Network (PSTN), and so forth. Although some embodiments may be described with a fixed device implemented as a base station or node B by way of example, it may be appreciated that other embodiments may be implemented using other wireless devices as well. The embodiments are not limited in this context.

In operation, various nodes of communications system 100 may create multiple data connections or channels between each other. For example, one or more data channels may be established to communicate information from a fixed device to a mobile device, typically referred as downlink channels. In another example, one or more data channels may be established to communicate information from the mobile device to the fixed device, typically referred as uplink channels. The mobile device and the fixed device may use transmitter node 102 and/or receiver node 120 to communicate information over the downlink and uplink channels to further set up a connection with a remote node on the Internet using a connection-oriented protocol, such as TCP, for example. If this is HTTP download traffic from the fixed node (e.g., a web server) to the mobile device, for example, the uplink channel only carries HTTP requests and TCP acknowledgements (ACK) while the downlink channel carries most of the requested data.

In various embodiments, the wireless devices may use various techniques to improve data throughput over the downlink channel and uplink channel. In one embodiment, for example, one or both wireless devices may include an asymmetric data channel manager (ADCM) to perform asymmetric link adaptation for multiple wireless data channels based on a class of data flow for each data channel. One or both wireless devices may also include an error control manager (ECM) to perform error control for the data channels in accordance with an ARQ protocol using various improved error control parameters. In one embodiment, the ADCM and ECM may be implemented at the MAC layer or cross-layers using a processor, such as signal processors 110, 128, a baseband processor, a MAC processor, or any other processor or processing system accessible by the wireless device. Communication system 100 in general, and the ADCM and ECM in particular, may be described in more detail with reference to FIG. 2.

Figure 2:
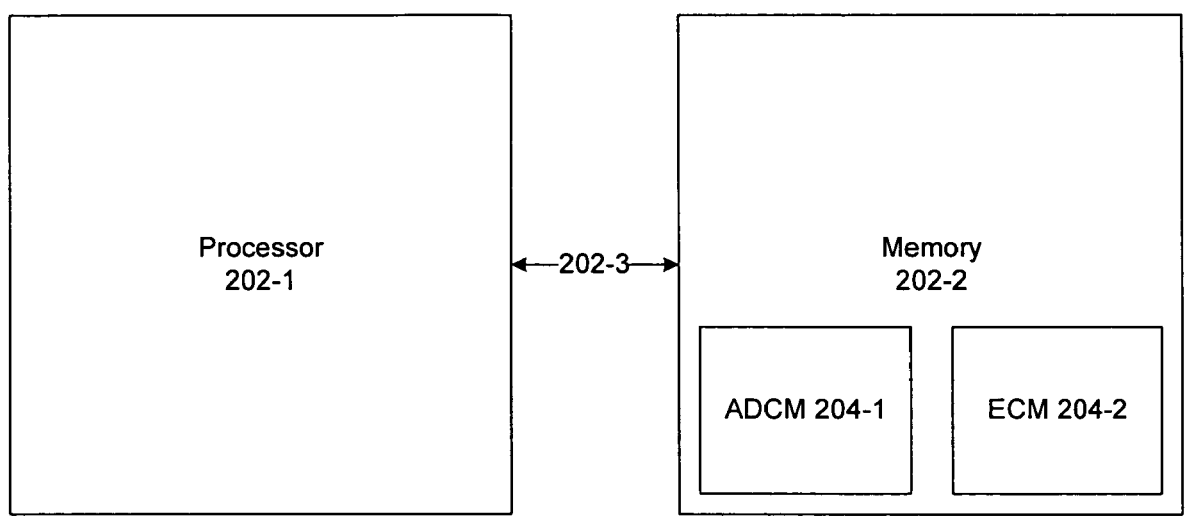
FIG. 2 illustrates one embodiment of a processing system.

FIG. 2 illustrates one embodiment of a processing system. FIG. 2 illustrates one embodiment of a processing system 200. In various embodiments, processing system 200 may comprise, or be implemented as, a MIMO signal processing system such as the TX MIMO signal processing block 110 and/or RX MIMO signal processing block 128, for example. In various embodiments, processing system 200 may comprise, or be implemented as, other processing systems accessible by a given wireless device, such as a baseband processor in a baseband processing sub-system, a MAC processor, a general purpose processor, an application specific processor, and so forth. The embodiments are not limited in this context.

In various embodiments, processing system 200 may include one or more elements 202-1-$p$, where p is a positive integer. For example, processing system 200 may include a processor 202-1, a memory 202-2, and a data bus 202-3 to connect processor 202-1 with memory 202-2. Although a limited number of elements may be illustrated and described for processing system 200 by way of example, it may be appreciated that more or less elements may be implemented for processing system 200, and still fall within the scope of the embodiments. The embodiments are not limited in this context.

In one embodiment, for example, element 202-1 may comprise a processor. Processor 202-1 may be implemented as any processor, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, processor 202-1 may be implemented as a general purpose processor, such as a processor made by Intel® Corporation, Santa Clara, Calif. Processor 202-1 may also be implemented as a dedicated processor, such as a controller, microcontroller, embedded processor, a digital signal processor (DSP), a network processor, a media processor, an input/output (I/O) processor, and so forth. The embodiments are not limited in this context.

In various embodiments, processing system 200 may include an element 202-2. In one embodiment, for example, element 202-2 may comprise memory. Memory 202-2 may include any machine-readable or computer-readable media capable of storing data, including both volatile and non-volatile memory. For example, memory 202-2 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 202-2 may be included on the same integrated circuit as processor 202-1, or alternatively some portion or all of memory 202-2 may be disposed on an integrated circuit or other medium, for example a hard disk drive, that is external to the integrated circuit of processor 202-1. The embodiments are not limited in this context.

In various embodiments, memory 202-2 may include one or more elements, such as elements 204-1-$m$, where m represents a positive integer. In one embodiment, for example, memory 202-2 may include an ADCM 204-1 and an ECM 204-2. Although a limited number of elements may be illustrated and described for memory 202-2 by way of example, it may be appreciated that more or less elements may be implemented for memory 202-2, and still fall within the scope of the embodiments. Furthermore, it may be appreciated that ADCM 204-1 and ECM 204-2 may be implemented using software, hardware, or a combination of both, as desired for a given set of performance and design constraints. The embodiments are not limited in this context.

In one embodiment, ADCM 204-1 may manage multiple wireless data channels to improve overall throughput for communication system 100. More particularly, ADCM 204-1 may be arranged to perform asymmetric link adaptation for multiple wireless data channels based on a class of data flow for each data channel. ADCM 204-1 may be used to perform independent and asymmetrical management of different data channels for the same class of TCP flows, to include uplink of download TCP traffic, downlink of download TCP traffic, uplink of upload TCP traffic and downlink of upload TCP traffic, for example.

In various embodiments, ADCM 204-1 may perform asymmetrical management of the different data channels by selecting a different modulation technique or modulation coding scheme (MCS) for each data channel. A modulation technique or MCS may refer to operations for varying a carrier signal, typically a sinusoidal signal, in order to use the signal to convey information. One of the three key characteristics of a signal is usually modulated, including its phase, frequency and/or amplitude. Examples of various MCS may include OFDM modulation, Quadrature Amplitude Modulation (QAM), N-state QAM (N-QAM) such as 16-QAM (four bits per symbol), 32-QAM (five bits per symbol), 64-QAM (six bits per symbol), 128-QAM (seven bits per symbol), and 256-QAM (eight bits per symbol), Differential QAM (DQAM), Binary Phase Shift Keying (BPSK) modulation, Quadrature Phase Shift Keying (QPSK) modulation, Offset QPSK (OQPSK) modulation, Differential QPSK (DQPSK), Frequency Shift Keying (FSK) modulation, Minimum Shift Keying (MSK) modulation, Gaussian MSK (GMSK) modulation, and so forth. It may be appreciated that some embodiments may use other MCS in addition to the examples given above, and the embodiments are not limited in this context.

In various embodiments, ADCM 204-1 may perform asymmetrical management of the different data channels by using different strategies for selecting MCS for each data channel based on a class of data flows communicated by each data channel. In one embodiment, for example, the downlink channel between a fixed device (e.g., a server) and a mobile device (e.g., a laptop) may have TCP flows that need higher amounts of bandwidths relative to the uplink channel. An example of such downlink TCP flows may include any type of media information and/or control information, such as applications, application data, HTML documents, XML documents, video, streaming video, images, audio, streaming audio, and so forth. Consequently, ADCM 204-1 may be arranged to aggressively use a more efficient MCS to increase the bandwidth of the downlink channel, thereby improving the aggregate TCP throughput for all users of the data channels available to communications system 100. By way of contrast, the uplink channel between the mobile device and the fixed device typically has TCP flows that need lower amounts of bandwidth relative to the downlink channels. Examples of such uplink TCP flows may also include any type of media information and/or control information, but is typically limited to carrying application requests and TCP ACK. Therefore having an uplink channel with comparable amounts of bandwidth relative to the downlink channel may not be as critical as other factors, such as robustness and response times. As a result, ADCM 204-1 may select a different MCS for the uplink channel. Given the relatively smaller size of the application requests and TCP ACKs, ADCM 204-1 may select a more conservative MCS to achieve a lower loss rate and lower delay rate, which in turn may benefit the overall end-to-end performance of TCP.

In various embodiments, ADCM 204-1 may use different MCS selection schemes for each data channel, with each MCS to have different performance characteristics such as packet error rate values and data rate per unit bandwidth values. In general, a more aggressive MCS selection scheme corresponds to a higher data rate but also a higher error rate. This may be described in more detail with reference to FIGS. 3-10.

Figure 3:
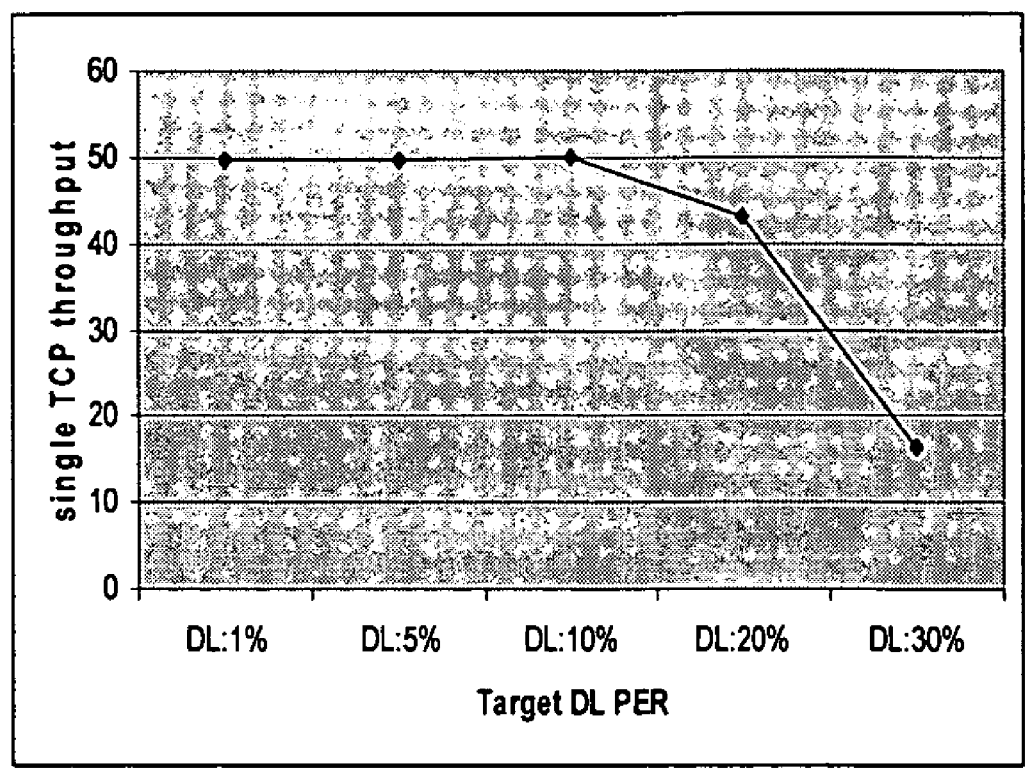
FIG. 3 illustrates one embodiment of a first graph.

FIG. 3 illustrates one embodiment of a first graph. FIG. 3 illustrates a graph 300. Graph 300 is a graph having values representing single TCP throughput in kilobytes-per-second (KBps) on a y-axis, and values representing target downlink packet error rates (PER) on an x-axis. In order to achieve a greater amount of bandwidth in the downlink channel, ADCM 204-1 may use a more aggressive MCS selection scheme having a higher target PER in link adaptation. The more aggressive MCS selection scheme may improve the efficiency of the link utilization without compromising individual TCP throughput. Graph 300 illustrates that individual TCP throughput decreases gracefully when using a more aggressive MCS, as long as the target PER is below approximately 20%.

Figure 4:
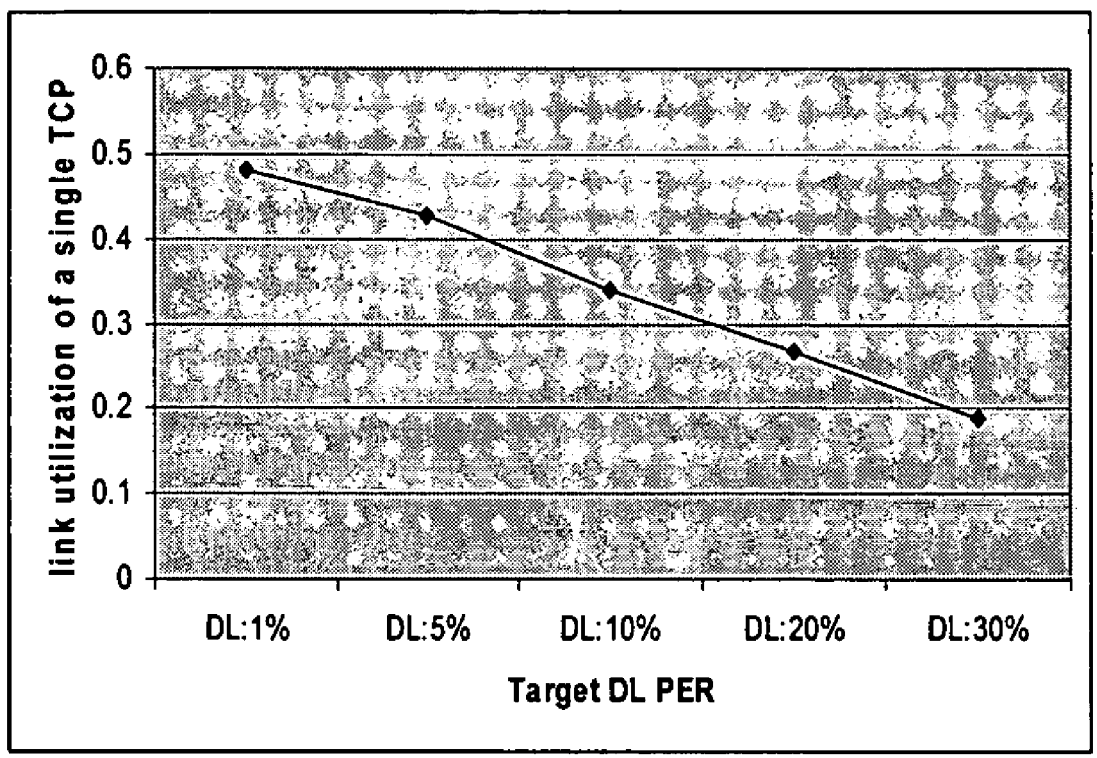
FIG. 4 illustrates one embodiment of a second graph.

FIG. 4 illustrates one embodiment of a second graph. FIG. 4 illustrates a graph 400. Graph 400 is a graph having values representing link utilization of a single TCP (e.g., a fraction of the total radio resources) on a y-axis, and values representing target downlink PER on an x-axis. Graph 400 illustrates that the link utilization of each TCP flow becomes more efficient as the target downlink PER is increased.

Figure 5:
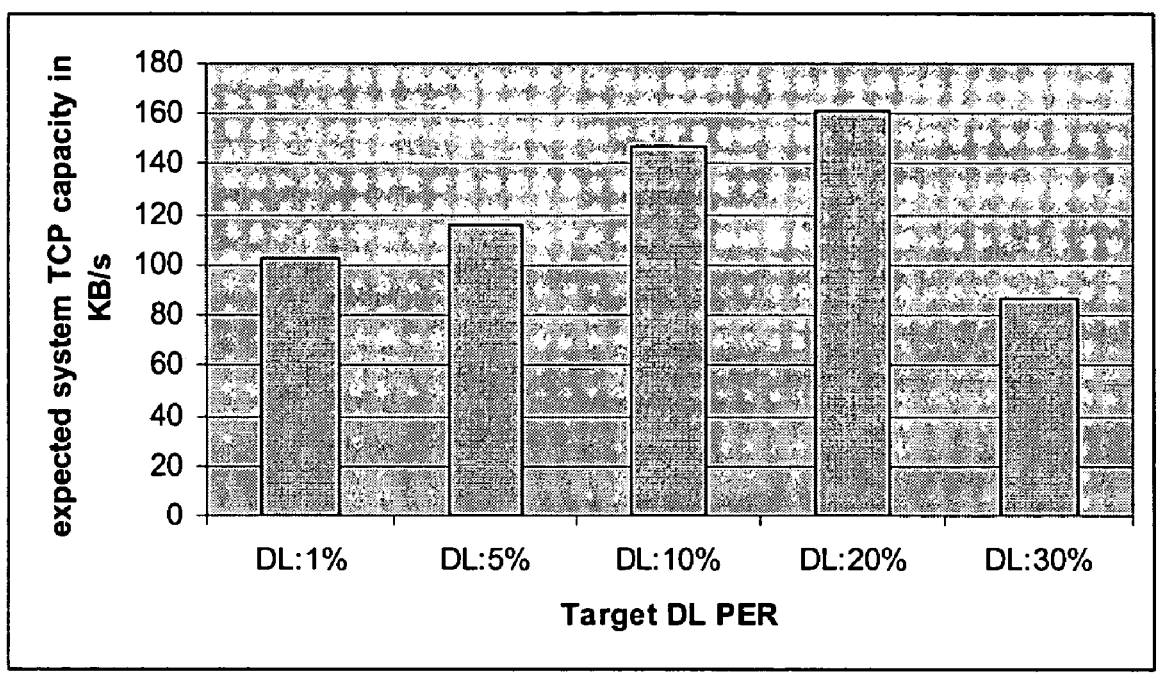
FIG. 5 illustrates one embodiment of a third graph.

FIG. 5 illustrates one embodiment of a third graph. FIG. 5 illustrates a graph 500. Graph 500 is a graph having values representing expected system TCP capacity in KBps on a y-axis, and values representing target downlink PER on an x-axis. Graph 500 illustrates that when ADCM 204-1 selects an aggressive MCS having a target downlink PER of approximately 20%, system capacity may be improved in terms of the aggregate TCP throughput communication system 100 may potentially support. It is worthy to note, however, that ADCM 204-1 should avoid selecting a PER that is too high for the error control protocol to handle. For example, graph 500 illustrates a throughput collapse at a target downlink PER of approximately 30%.

Figure 6:
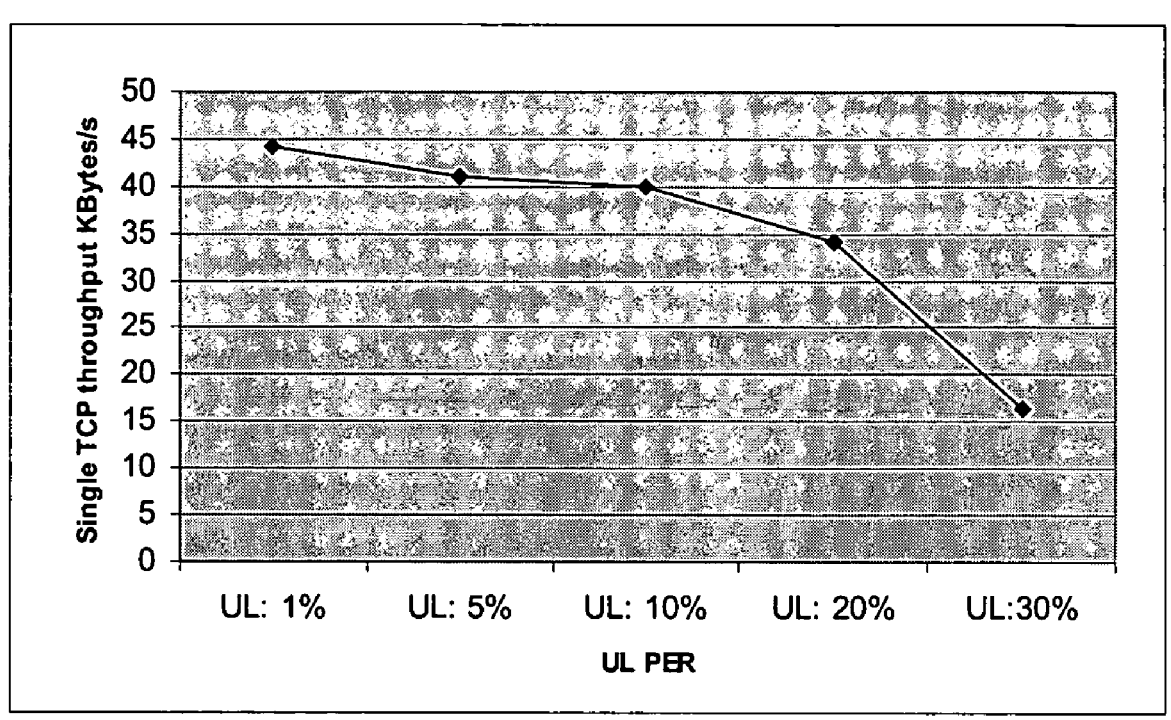
FIG. 6 illustrates one embodiment of a fourth graph.

FIG. 6 illustrates one embodiment of a fourth graph. FIG. 6 illustrates a graph 600. Graph 600 is a graph having values representing single TCP throughput in KBps on a y-axis, and values representing a target uplink PER on an x-axis. In accordance with the asymmetrical management of the data channels, ADCM 204-1 may select a different MCS for the uplink channel as compared to the MCS selected for the downlink channel. For example, ADCM 204-1 may select a more conservative MCS for the uplink channel, and a more aggressive MSC for the downlink channel. For the uplink channel, ADCM 204-1 may attempt to further improve single TCP throughput by selecting a more conservative MCS that is better suited for providing robustness and reduced delay. As shown by graph 600, single TCP throughput increases as the target uplink PER decreases. Therefore, ADCM 204-1 may select a more conservative MCS for the uplink channel that provides a target uplink PER somewhere below approximately 10%. Beyond 10%, TCP throughput decreases significantly. In server-client based TCP flows, the bandwidth for the uplink channel may not necessarily be an issue based on the class of TCP flows communicated by the uplink channel. Consequently, efficiency of link utilization for the uplink channel may not be as critical as in the downlink channel. Accordingly, ADCM 204-1 may select an MCS that is suited to the TCP flows communicated by the uplink channel, rather than selecting a single symmetric MCS for both the downlink and uplink channels.

As illustrated using graphs 300, 400 and 500, ADCM 204-1 may select a first MCS for a downlink data channel between a fixed device and a mobile device. For example, ADCM 204-1 may select a more aggressive MCS depending upon channel conditions of the downlink data channel. Examples of more aggressive MCS may include an N-state QAM (N-QAM) (e.g., 16-QAM, 32-QAM, 64-QAM, 128-QAM, 256-QAM, and so forth) which may carry more data per symbol, and therefore is more efficient and provides higher potential data rates. The more aggressive MCS, however, may have a higher associated PER and delay or latency values as compared to other MCS. As an example, when the signal-to-noise ratio (SNR) is C, ADCM 204-1 may select an N-QAM MCS for the downlink channel in order to increase aggregated TCP bandwidth in accordance with the assumptions and values described with reference to graphs 300-500. The embodiments are not limited in this context.

As illustrated using graph 600, ADCM 204-1 may select a second MCS for an uplink data channel between the mobile device and the fixed device. In contrast to the aggressive MCS, a more conservative MCS such as QPSK carries fewer amounts of data per symbol, and therefore may have a lower associated PER and delay/latency values. The more conservative MCS, however, may have a lower potential bandwidth efficiency and thus lower data rate as compared to other MCS. Consequently, assuming that the uplink channel has the same SNR of C, ADCM 204-1 may select QPSK for the uplink channel in order to provide more robustness and lower latency in accordance with the assumptions and values described with reference to graph 600. The embodiments are not limited in this context.

In addition to selecting different MCS for the downlink and uplink channels, ADCM 204-1 may also be arranged to use different MCS selection schemes in order to determine when a given MCS may be used for a given data channel. In some cases, ADCM 204-1 may be arranged to use a more conservative MCS selection scheme. An example of a conservative MCS selection scheme may include using QPSK if the SNR is lower than 10 and 16QAM if the SNR is greater than 10. In some cases, ADCM 204-1 may also be arranged to use a more aggressive MCS selection scheme. An example of an aggressive MCS selection scheme may include using QPSK if the SNR is lower than 1 and 16QAM if the SNR is greater than 1. The use of a more conservative or aggressive MCS selection scheme by ADCM 204-1 may depend upon several factors, such as operating environments, channel conditions, target TCP throughput rates, number of users, number of available data channels, power constraints, and so forth. The embodiments are not limited in this context.

It may be appreciated that N-QAM and QPSK are only two examples of the type of MCS available for use by ADCM 204-1, and the SNR values are only examples of the threshold parameters potentially used for MCS selection. Other MCS and threshold parameters may be selected as desired for a given set of performance and design constraints. The embodiments are not limited in this context.

It is worthy to note that in some cases ADCM 204-1 may select different MCS for each data channel regardless of a SNR for the data channel. For example, some wireless systems may switch an MCS in response to changes in the SNR for the data channel. Transmitter node 102 and/or receiver node 120 may periodically measure characteristics of the data channel, and provide channel information updates. The channel information updates may include changes in SNR for the data channel. Transmitter node 102 and/or receiver node 120 may switch MCS based on a degradation or improvement in the SNR for the data channel. Although ADCM 204-1 is capable of performing link adaptation in accordance with changes in the SNR for a data channel, ADCM 204-1 is also capable of performing link adaptation when the SNR remains stable or relatively unchanged. In this manner, ADCM 204-1 may be capable of enhancing TCP throughput over one or more data channels regardless of SNR measurements and other channel update information.

In various embodiments, ECM 204-2 may also be used to enhance data throughput over the data channels in addition to ADCM 204-1. ECM 204-2 may be used to implement error control for the data channel using one or more error control protocols. In one embodiment, for example, the ECM may be arranged to operate in accordance with an ARQ protocol. The ARQ protocol is an error control technique for data transmission in which receiver node 120 detects transmission errors in a message and automatically requests a retransmission from transmitter node 102. In normal operation, when transmitter node 102 receives an ARQ, transmitter node 102 may retransmit the message until it is either correctly received by receiver node 120, or alternatively, the error persists beyond a predetermined number of retransmission attempts. Examples of ARQ protocols may include a stop-and-wait ARQ, go-back-n ARQ, selective repeat ARQ, and others as well. The embodiments are not limited in this context.

In various embodiments, ECM 204-2 may be arranged to support or enhance the asymmetrical management of the uplink and downlink channels as performed by ADCM 204-1. For the downlink channel, for example, ECM 204-2 may operate in accordance with a set of defined ARQ parameters and values that will not compromise the link error rate and round trip time (RTT) observed by TCP, such that individual TCP performance remains largely uncompromised even with relatively higher PER due to aggressive MCS selection. As with the uplink channel, ECM 204-2 may be arranged with the proper ARQ parameters appropriate for the class of data flows used by the uplink channel.

In various embodiments, ECM 204-2 may implement and manage an error control protocol such as ARQ to handle link errors and realize performance tradeoffs. ECM 204-2 may be arranged with the proper ARQ settings in order to determine the technique which allows TCP to smoothly operate without experiencing excessive packet losses and retransmissions. ECM 204-2 may have ARQ settings designed to interact across various layers in the protocol stack, such as both the physical layer and the TCP transport layer, for example. In this manner, ECM 204-2 may implement improved ARQ settings designed to operate across multiple networking layers.

In various embodiments, ECM 204-2 may implement several key ARQ parameters. Examples of ARQ parameters may include a retransmission time value, a maximum number of retries value (or retry value), a block size value, and so forth. The embodiments are not limited in this context.

In various embodiments, ECM 204-2 may be arranged to perform error control for the downlink and uplink data channels in accordance with an ARQ protocol using a retransmission time value that is greater than a channel information update value. ECM 204-2 may use the retransmission time value to determine how fast transmitter node 102 should retransmit a block if no ACK/NACK is received by receiver node 120. An ARQ retransmit timer may use a retransmission time value defined in accordance with the following guidelines or rules. The first guideline or rule is that ECM 204-2 should not perform ARQ retransmission at a rate that is faster than the update of channel link information. For example, a WiMAX system may use a CQICH communication field to retrieve downlink channel feedback information. Assuming ECM 204-2 is set to retrieve channel information updates from the CQICH field every 4 frames or 20 milliseconds (ms), ECM 204-2 should perform ARQ retransmission at a rate that is slower than every 20 ms. Otherwise, packet errors may repeat due to poor link adaptation. The second guideline or rule is that ECM 204-2 should perform ARQ retransmission as fast as possible in order to reduce RTT delay and jitter experienced by TCP. These two guidelines or rules may be further described with reference to FIG. 7.

Figure 7:
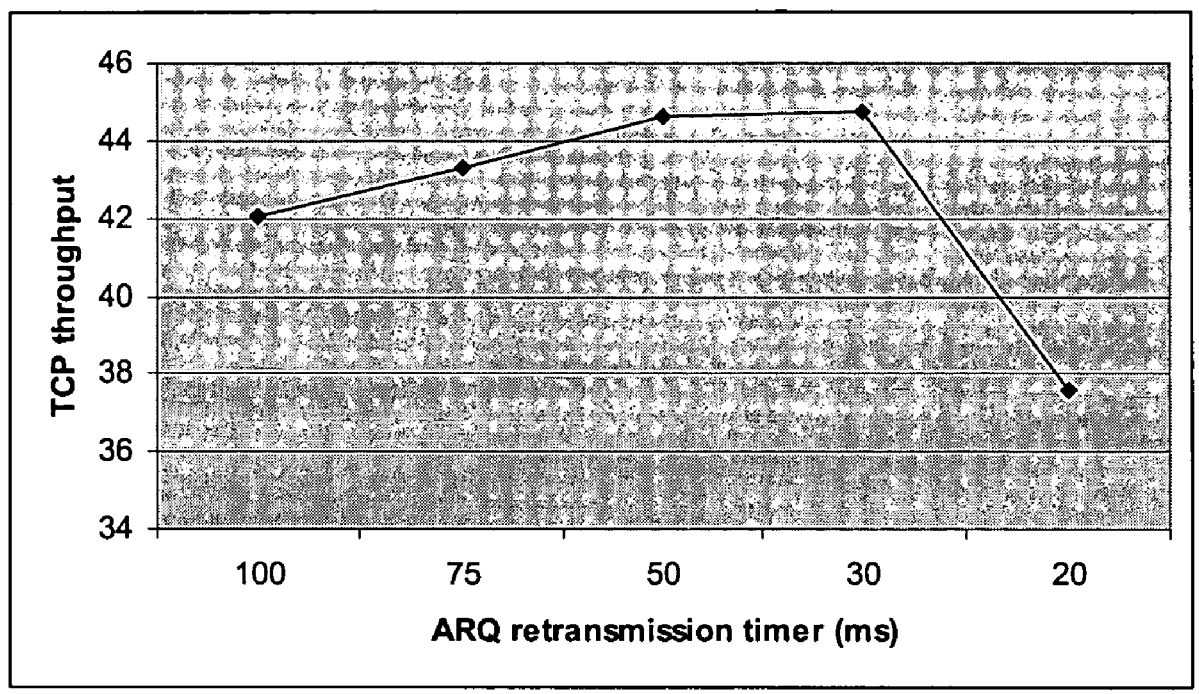
FIG. 7 illustrates one embodiment of a fifth graph.

FIG. 7 illustrates one embodiment of a fifth graph. FIG. 7 illustrates a graph 700. Graph 700 is graph having values representing TCP throughput on a y-axis, and values representing ARQ retransmission times in milliseconds on an x-axis. Given the guidelines or rules previously described, graph 700 illustrates that improved TCP throughput occurs when ECM 204-2 uses an ARQ retransmission timer having a retransmission time value of approximately 30-50 ms, which is just above the channel feedback interval of 20 ms. The use of longer ARQ retransmission times may lead to a graceful decrease of TCP throughput, as shown in graph 700.

In various embodiments, ECM 204-2 may be arranged to perform error control for the data channels in accordance with an ARQ protocol using a retry value to increase information throughput over the wireless data channels. ECM 204-2 may use the retry value to determine a maximum number of retries to attempt before discarding a block. The ARQ protocol may instead implement a maximum block lifetime parameter for this purpose. In general, a given retry value should be selected in conjunction with the retransmission time value. Choosing a smaller ARQ retransmission time value allows ECM 204-2 to perform a larger number of retries without significantly increasing the expected delay from ARQ. In addition, given the proper setting for the ARQ retransmission time value, it may not take too many retries to successfully transmit a packet. Consequently, a larger number of retries is generally safe and may improve the performance of communication system 100. This may be described in more detail with reference to FIG. 8.

Figure 8:
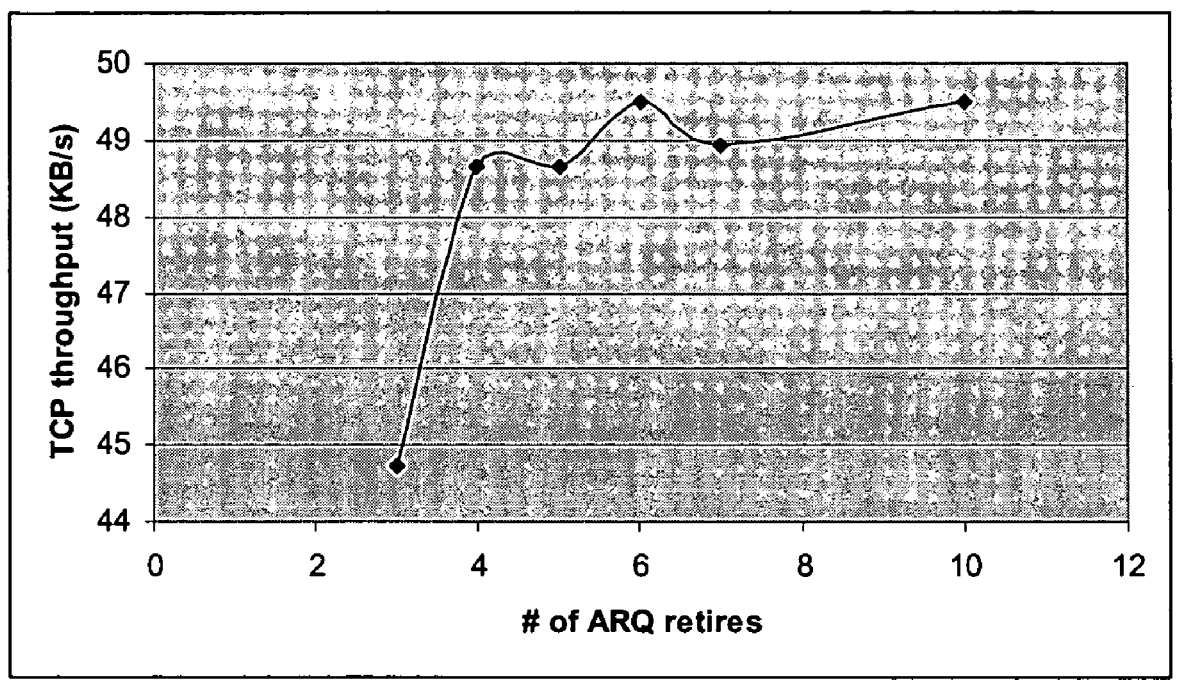
FIG. 8 illustrates one embodiment of a sixth graph.

FIG. 8 illustrates one embodiment of a sixth graph. FIG. 8 illustrates a graph 800. Graph 800 is a graph having values representing TCP throughput in KBps on a y-axis, and values representing retry values on an x-axis. As shown by graph 800, the TCP throughput increases substantially between the retry values of 2 and 4, and marginally improves as the retry values approach 10 and 12. Consequently, ECM 204-2 may have a retry value of approximately 4-10 in order to improve TCP throughput of the downlink and uplink data channels used by communication system 100.

In various embodiments, ECM 204-2 may be arranged to perform error control for the data channels in accordance with an ARQ protocol using different block sizes for each data channel based on the class of data flows. The ARQ block size parameter may determine the minimal MAC packet data unit (PDU) size, since packet fragmentation typically only happens at ARQ block boundaries. In one embodiment, for example, ECM 204-2 may use asymmetric ARQ blocks for TCP connections. For example, ECM 204-2 may use smaller blocks for the lower throughput TCP ACK channel (e.g., uplink channel) and a larger block size for the potentially high throughput TCP data channel (e.g., downlink channel).

ECM 204-2 should use an ARQ block size that represents a tradeoff between throughput required for the TCP connection and the potential overhead in using a larger ARQ block size. A larger ARQ block size may provide several advantages. For example, a larger ARQ block size may provide a larger ARQ window size for high throughput connections. In addition, a larger ARQ block size may be needed for a high throughput TCP connection in order to keep up with the data rate. In some cases, however, a larger ARQ block size may not be fully used therefore leading to inefficient utilization of the data channel. This may particularly apply to the uplink channel since the fixed device may not know the block size of the mobile device when scheduling. Furthermore, a larger block size may be potentially wasted if the TCP packet size is not an exact multiple of the ARQ block size. Since the TCP ACK channel (e.g., uplink channel) is typically a lower throughput channel and the TCP data channel (e.g., downlink channel) is typically a higher throughput channel, it may be advantageous to set a smaller ARQ block size for the uplink channel and a larger ARQ block size for the downlink channel. This may be described in more detail with reference to FIG. 9.

Figure 9:
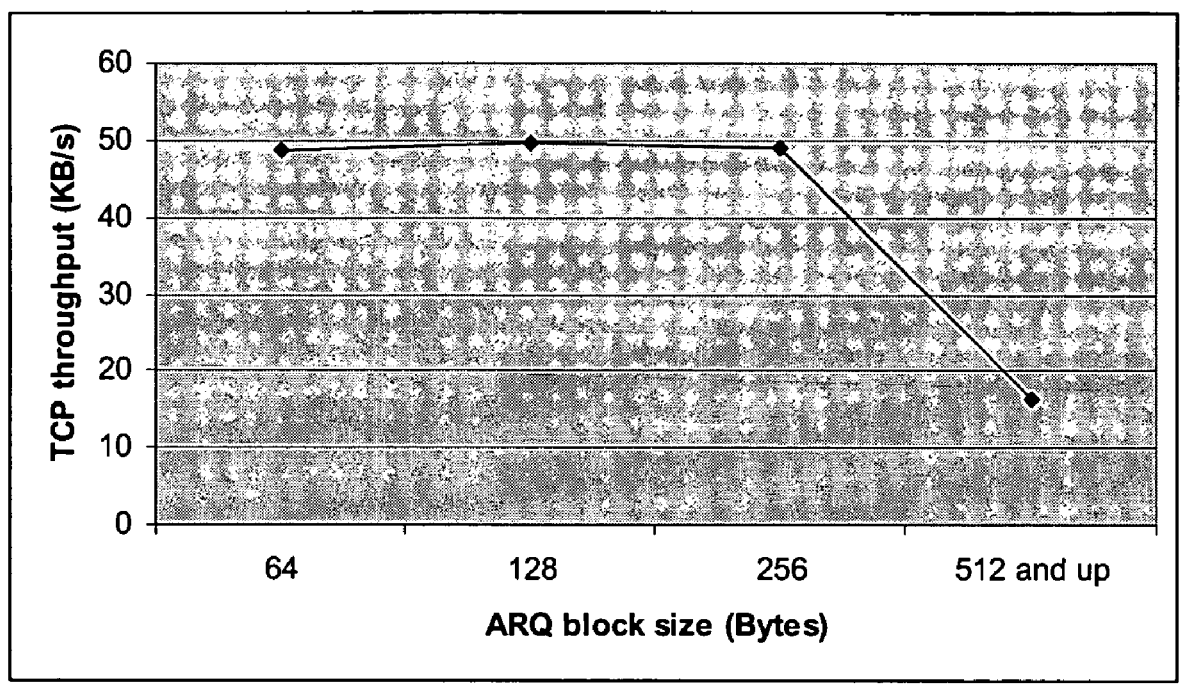
FIG. 9 illustrates one embodiment of a seventh graph.

FIG. 9 illustrates one embodiment of a seventh graph. FIG. 9 illustrates a graph 900. Graph 900 is a graph having values representing TCP throughput in KBps on a y-axis, and values representing ARQ blocks sizes on an x-axis. Graph 900 illustrates that TCP throughput may decrease as the ARQ block size increases. In particularly, the TCP throughput may sharply decrease as the ARQ block size exceeds 256 bytes. Consequently, it may be desirable to set an ARQ block size of approximately 128-256 bytes for a downlink channel on a WiMAX system such as communication system 100, particularly when the downlink channel is used for high throughput file transfers to support HTTP or FTP applications, for example. A smaller ARQ block size may be set for the uplink channel to increase channel utilization and efficiency for the uplink channel.

Operations for various embodiments may be further described with reference to the following figures and accompanying examples. Some of the figures may include a logic flow. It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

Figure 10:
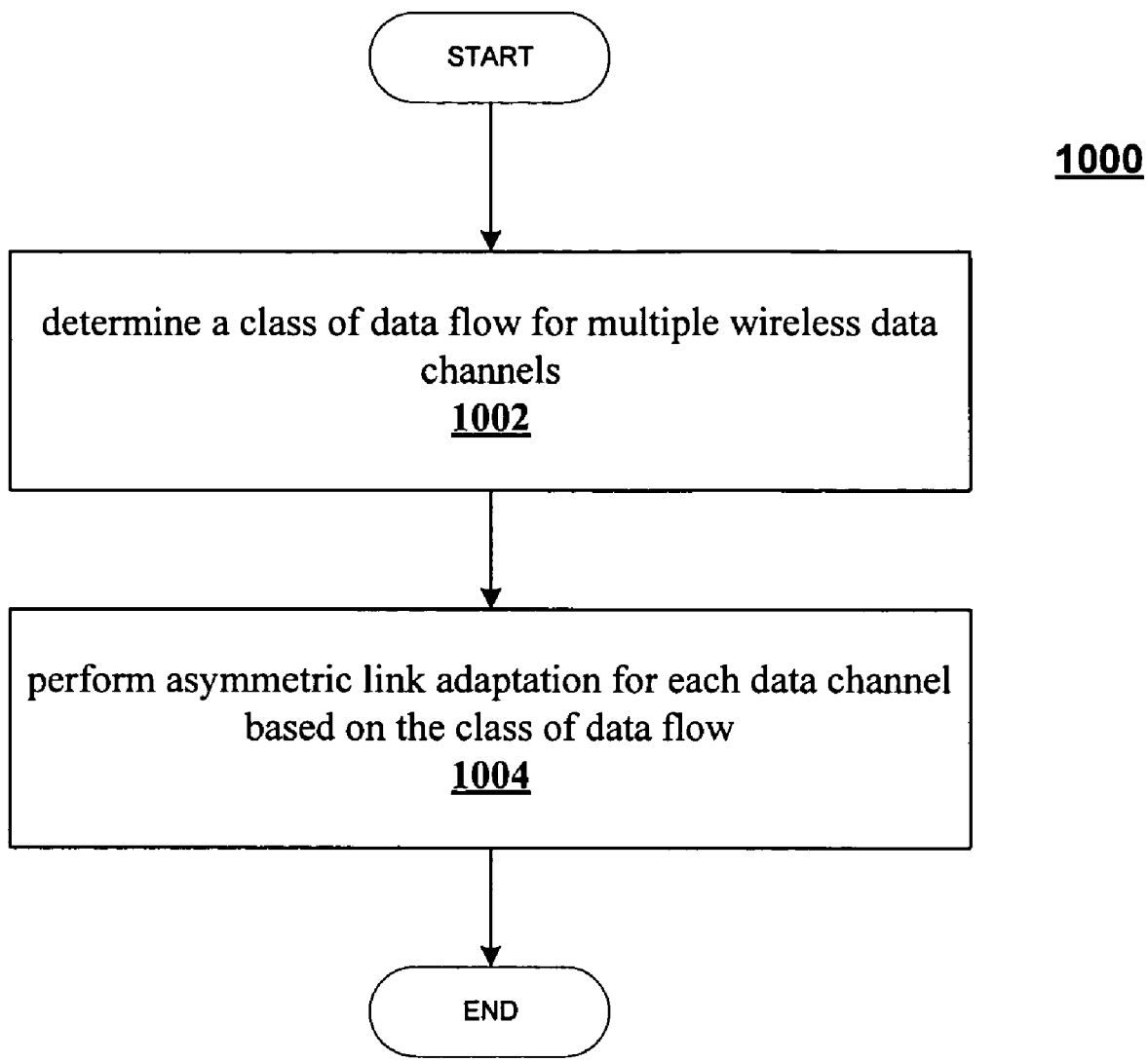
FIG. 10 illustrates one embodiment of a logic flow.

FIG. 10 illustrates one embodiment of a logic flow. FIG. 10 illustrates a logic flow 1000. In various embodiments, the logic flow 1000 may be performed by various systems, nodes, and/or modules. It is to be understood that the logic flow 1000 may be implemented by various other types of hardware, software, and/or combination thereof. The embodiments are not limited in this context.

In one embodiment, logic flow 1000 may determine a class of data flow for multiple wireless data channels at block 1002. Logic flow 1000 may perform asymmetric link adaptation for each data channel based on the class of data flow at block 1004. The embodiments are not limited in this context.

In one embodiment, a different MCS may be selected for each data channel based on the class. The different MCS may be selected for each data channel regardless of a SNR for the data channel. In other words, different MCS may be selected even though the SNR for the data channel remains approximately the same or unchanged. The different MCS selected for each data channel may have different PER values and data rate per unit bandwidth values. For example, the MCS selected for a downlink channel may have a higher PER and delay values, while the MCS selected for an uplink channel may have a lower PER and delay values. The embodiments are not limited in this context.

In one embodiment, error control may be performed for the data channels in accordance with an ARQ using a retransmission time value that is greater than a channel information update value. Setting the retransmission time value to a value that is greater than a channel information update value may reduce the possibility of repeating packet errors due to inefficient link adaptation. In addition, error control may be performed using different ARQ block sizes for each data channel based on the class of data flows. Further, error control may be performed using an ARQ retry value that increases information throughput over the wireless data channels. The embodiments are not limited in this context.

Figure 11:
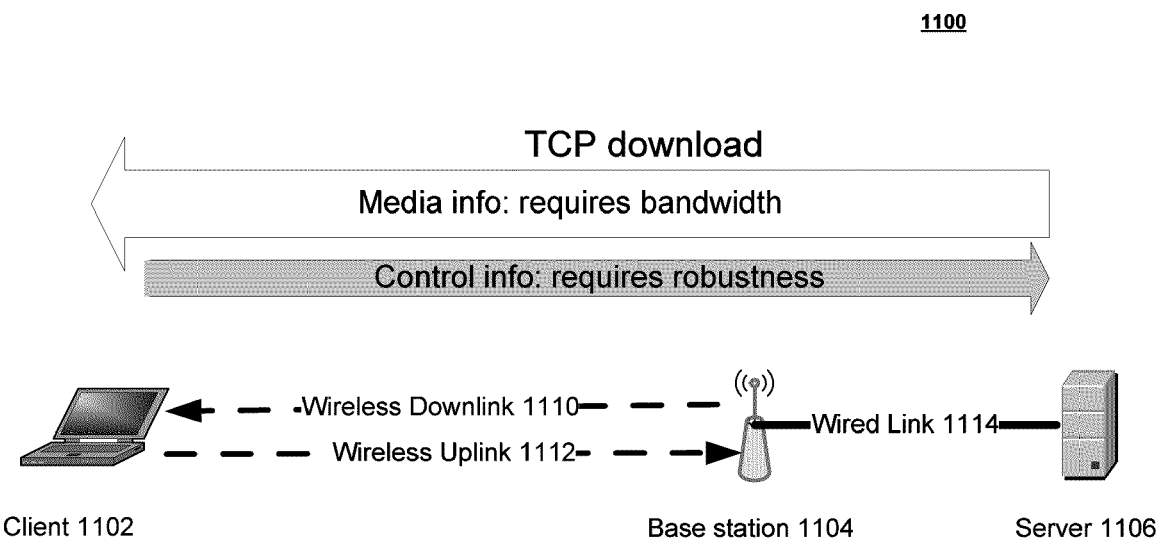
FIG. 11 illustrates one embodiment of a data communication system.

FIG. 11 may illustrate one embodiment of a data communication system. FIG. 11 illustrates a data communication system 1100 suitable for use with one or more embodiments. FIG. 11 illustrates a client 1102 in communication with a base station 1104 via wireless downlink channel 1110 and wireless uplink channel 1112. Base station 1104 may communicate with a server 1106 via a wired link 1114. Client 1102 and base station 1104 may use transmitter node 102 and/or receiver node 120 to communicate information over channels 1110, 1112 to further set up a connection with a remote node on the Internet such as server 1106 using a connection-oriented protocol, such as TCP, for example. If this is HTTP download traffic from server 1106 to client 1102, for example, wireless uplink channel 1112 only carries control information such as HTTP requests and TCP acknowledgements (ACK), while wireless downlink channel 1110 carries most of the media information in the form of requested data. TCP throughput for data communication system 1100 may be improved by using one or more aggressive MCS selection or selection scheme techniques, as previously described.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an ASIC, PLD, DSP, and so forth. In yet another example, an embodiment may be implemented by any combination of programmed general-purpose computer components and custom hardware components. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus comprising an asymmetric data channel manager to perform asymmetric link adaptation for multiple wireless data channels based on a class of data flow for each data channel, and to select different modulation coding schemes for each data channel when a signal-to-noise ratio for said data channel remains stable and when a signal-to-noise ratio for said data channel changes, and an error control manager to perform error control for said data channels in accordance with an automatic repeat-request protocol using a retransmission time value that is greater than a channel information update value.

2. The apparatus of claim 1, said asymmetric data channel manager to select different modulation coding schemes for each data channel based on said class.

3. The apparatus of claim 1, said asymmetric data channel manager to select different modulation coding schemes for each data channel, said modulation coding schemes to have different packet error rate values and data rate per unit bandwidth values.

4. The apparatus of claim 1, said asymmetric data channel manager to select a first modulation coding scheme for a downlink data channel between a fixed device and a mobile device, and a second modulation coding scheme for an uplink data channel between said mobile device and said fixed device.

5. The apparatus of claim 1, comprising an error control manager to perform error control for said data channels in accordance with an automatic repeat-request protocol using different block sizes for each data channel based on said class.

6. The apparatus of claim 1, comprising an error control manager to perform error control for said data channels in accordance with an automatic repeat-request protocol using a retry value to increase information throughput over said wireless data channels.

7. A system, comprising:
at least one antenna;
a transceiver to connect to said antenna, said transceiver to communicate over multiple wireless data channels;
an asymmetric data channel manager to connect to said transceiver, said asymmetric data channel manager to perform asymmetric link adaptation for multiple wireless data channels based on a class of data flow for each data channel, and to select different modulation coding schemes for each data channel when a signal-to-noise ratio for said data channel remains stable and when a signal-to-noise ratio for said data channel changes; and
an error control manager to perform error control for said data channels in accordance with an automatic repeat-request protocol using a retransmission time value that is greater than a channel information update value.

8. The system of claim 7, said asymmetric data channel manager to select different modulation coding schemes for each data channel based on said class.

9. The system of claim 7, said asymmetric data channel manager to select different modulation coding schemes for each data channel, said modulation coding schemes to have different packet error rate values and data rate per unit bandwidth values.

10. The system of claim 7, said asymmetric data channel manager to select a first modulation coding scheme for a downlink data channel between a fixed device and a mobile device, and a second modulation coding scheme for an uplink data channel between said mobile device and said fixed device.

11. The system of claim 7, comprising an error control manager to perform error control for said data channels in accordance with an automatic repeat-request protocol using different block sizes for each data channel based on said class.

12. The system of claim 7, comprising an error control manager to perform error control for said data channels in accordance with an automatic repeat-request protocol using a retry value to increase information throughput over said wireless data channels.

13. A method, comprising:
 determining a class of data flow for multiple wireless data channels by using an asymmetrical data channel manager;
 performing asymmetric link adaptation for each data channel based on said class of data flow; and
 selecting different modulation coding schemes for each data channel when a signal-to-noise ratio for said data channel remains stable and when a signal-to-noise ratio for said data channel changes; and
 performing error control for said data channels in accordance with an automatic repeat-request protocol using a retransmission time value that is greater than a channel information update value.

14. The method of claim 13, comprising selecting different modulation coding schemes for each data channel based on said class.

15. The method of claim 13, comprising selecting different modulation coding schemes for each data channel, said modulation coding schemes to have different packet error rate values and data rate per unit bandwidth values.

16. The method of claim 13, comprising selecting a first modulation coding scheme for a downlink data channel between a fixed device and a mobile device, and a second modulation coding scheme for an uplink data channel between said mobile device and said fixed device.

17. The method of claim 13, comprising performing error control for said data channels in accordance with an automatic repeat-request protocol using different block sizes for each data channel based on said class.

18. The method of claim 13, comprising performing error control for said data channels in accordance with an automatic repeat-request protocol using a retry value to increase information throughput over said wireless data channels.

19. An article comprising a machine-readable storage medium containing instructions that if executed enable a system to determine a class of data flow for multiple wireless data channels, perform asymmetric link adaptation for each data channel based on said class of data flow, select different modulation coding schemes for each data channel when a signal-to-noise ratio for said data channel remains stable and when a signal-to-noise ratio for said data channel changes, and perform error control for said data channels in accordance with an automatic repeat-request protocol using a retransmission time value that is greater than a channel information update value.

20. The article of claim 19, further comprising instructions that if executed enable the system to select different modulation coding schemes for each data channel based on said class.

21. The article of claim 19, further comprising instructions that if executed enable the system to select a first modulation coding scheme for a downlink data channel between a fixed device and a mobile device, and a second modulation coding scheme for an uplink data channel between said mobile device and said fixed device.

22. The article of claim 19, further comprising instructions that if executed enable the system to perform error control for said data channels in accordance with an automatic repeat-request protocol using different block sizes for each data channel based on said class.

* * * * *